(12) United States Patent
Nelson et al.

(10) Patent No.: US 8,443,063 B1
(45) Date of Patent: May 14, 2013

(54) DETERMINATION OF COMMUNICATION NETWORKS FOR A WIRELESS COMMUNICATION DEVICE

(75) Inventors: Rodney Dewaine Nelson, Overland Park, KS (US); Patrick Scott Carter, Leawood, KS (US); Kevin J. Quirk, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 288 days.

(21) Appl. No.: 13/012,163

(22) Filed: Jan. 24, 2011

(51) Int. Cl.
*G06F 15/16* (2006.01)
*G06F 15/173* (2006.01)

(52) U.S. Cl.
USPC ............ 709/221; 709/222; 709/228; 709/238

(58) Field of Classification Search .................. 709/203, 709/217, 219, 221, 222, 226, 228, 238; 370/328, 370/331; 726/3; 455/70, 414.2, 456.2
See application file for complete search history.

(56) References Cited

U.S. PATENT DOCUMENTS

| | | | |
|---|---|---|---|
| 6,119,003 A | 9/2000 | Kukkohovi | |
| 6,192,224 B1 | 2/2001 | Grayson et al. | |
| 6,829,481 B2 | 12/2004 | Souissi | |
| 6,879,600 B1 | 4/2005 | Jones et al. | |
| 7,139,570 B2 | 11/2006 | Elkarat et al. | |
| 7,162,253 B2 * | 1/2007 | Vare et al. | 709/238 |
| 7,274,917 B2 | 9/2007 | Almgren | |
| 7,359,715 B2 | 4/2008 | Choksi | |
| 7,509,122 B2 | 3/2009 | Xue et al. | |
| 7,593,727 B2 | 9/2009 | Zhao et al. | |
| 7,761,098 B1 | 7/2010 | Nguyen et al. | |
| 7,995,997 B2 * | 8/2011 | Vare et al. | 709/230 |
| 2005/0190716 A1 | 9/2005 | Buckley et al. | |
| 2005/0233705 A1 * | 10/2005 | Vare et al. | 455/70 |
| 2006/0217153 A1 | 9/2006 | Coles et al. | |
| 2007/0275717 A1 | 11/2007 | Edge et al. | |
| 2009/0094351 A1 * | 4/2009 | Gupta et al. | 709/220 |
| 2009/0094680 A1 * | 4/2009 | Gupta et al. | 726/3 |
| 2010/0110993 A1 * | 5/2010 | Jain et al. | 370/328 |
| 2011/0002295 A1 * | 1/2011 | Ghosal et al. | 370/331 |

* cited by examiner

*Primary Examiner* — Quang N Nguyen

(57) ABSTRACT

A network control system to determine alternative networks for a wireless communication device comprises a processing system and a communication transceiver. The processing system is configured to determine an identifier of a first wireless access node in communication with a first communication network serving the wireless communication device, and process the identifier of the first wireless access node with a network data structure to determine a second communication network for the wireless communication device based on the identifier. The communication transceiver is configured to transfer the network data associated with the second communication network for delivery to the wireless communication device, wherein the wireless communication device is configured to initiate a handoff to a second wireless access node in communication with the second communication network based on the network data associated with the second communication network.

11 Claims, 9 Drawing Sheets

| CDMA BSID | WIMAX BSID | WI-FI SSID |
|---|---|---|
| A4DF337B2D29 | 1FE25357322D | my_hotspot |
| 22F95425A8DF | 1DFE4A8101EE | overdrive |
| DD8743A0EE23 | 1DFE22B2DF44 | sierra1 |
| 62305C9821FA | 1DFEA3DD40CB | |

NETWORK DATA STRUCTURE 500

DETERMINATION OF COMMUNICATION NETWORKS FOR A WIRELESS COMMUNICATION DEVICE

TECHNICAL BACKGROUND

A wireless communication device communicates with a serving wireless access node using a radio frequency (RF) signal over a wireless communication link. As wireless networks evolve and the latest generation networks are established, there is an increasing occurrence of overlay networks and the emergence of wireless communication devices that support multiple wireless access technologies. Typically, newer wireless access technologies that are more recently deployed provide greater bandwidth and faster data transfer speeds over legacy networks.

Modern wireless communication devices are often equipped with multiple radio antennas to enable wireless communications with different types of wireless access networks, such as third generation (3G), fourth generation (4G), and IEEE 802.11 (Wi-Fi) wireless technologies. Wireless network service providers and device users both typically prefer a multi-mode device to utilize 4G wireless access technology when the device is in a coverage area that supports 4 G communications. Therefore, such wireless communication devices are often configured to search for a 4G wireless access network upon startup. In cases where the wireless communication device cannot locate a 4G signal, the device may utilize 3G service. When connected to a 3G wireless network, the communication device typically powers up a 4G radio antenna periodically to search for 4G coverage, causing battery drain and possible interruption of the 3G service.

OVERVIEW

A method to determine alternative networks for a wireless communication device is disclosed. The method comprises, in the wireless communication device, determining an identifier of a first wireless access node in communication with a first communication network serving the wireless communication device, and transferring a request for network data associated with a second communication network for delivery to a network control system, wherein the request includes the identifier of the first wireless access node. The method further comprises, in the network control system, processing the identifier of the first wireless access node with a network data structure to determine the second communication network for the wireless communication device based on the identifier, and transferring the network data associated with the second communication network for delivery to the wireless communication device. The method further comprises, in the wireless communication device, initiating a handoff to a second wireless access node in communication with the second communication network based on the network data associated with the second communication network.

A network control system to determine alternative networks for a wireless communication device comprises a processing system and a communication transceiver. The processing system is configured to determine an identifier of a first wireless access node in communication with a first communication network serving the wireless communication device, and process the identifier of the first wireless access node with a network data structure to determine a second communication network for the wireless communication device based on the identifier. The communication transceiver is configured to transfer the network data associated with the second communication network for delivery to the wireless communication device, wherein the wireless communication device is configured to initiate a handoff to a second wireless access node in communication with the second communication network based on the network data associated with the second communication network.

A method of operating a network control system to determine alternative networks for a wireless communication device is disclosed. The method comprises determining an identifier of a first wireless access node in communication with a first communication network serving the wireless communication device. The method further comprises processing the identifier of the first wireless access node with a network data structure to determine a second communication network for the wireless communication device based on the identifier. The method further comprises transferring the network data associated with the second communication network for delivery to the wireless communication device, wherein the wireless communication device is configured to initiate a handoff to a second wireless access node in communication with the second communication network based on the network data associated with the second communication network.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
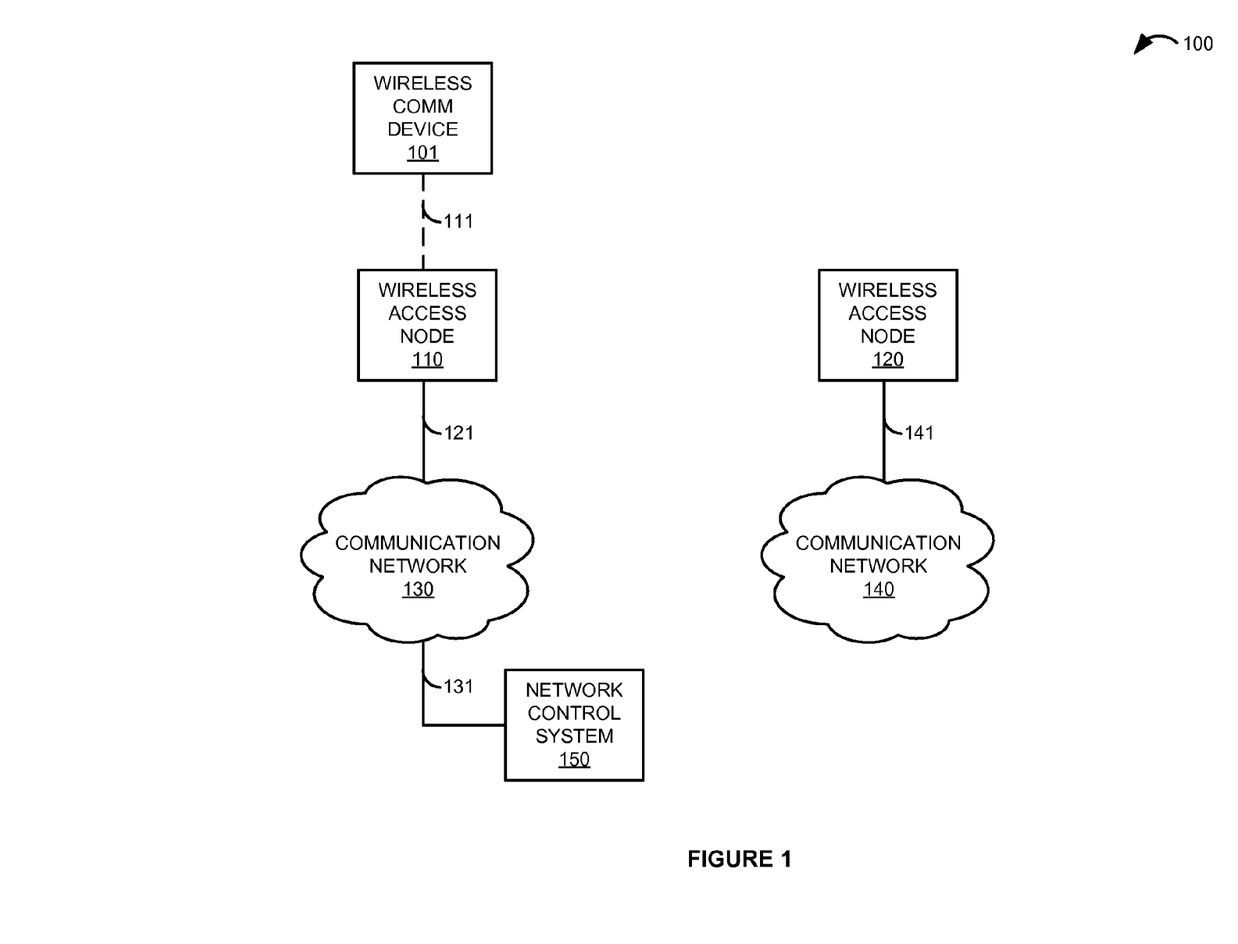
FIG. 1 is a block diagram that illustrates a communication system.

FIG. 1 is a block diagram that illustrates communication system 100. Communication system 100 includes wireless communication device 101, wireless access nodes 110 and 120, communication networks 130 and 140, and network control system 150. Wireless communication device 101 and wireless access node 110 are in communication over wireless communication link 111. Although not shown in FIG. 1, wireless communication device 101 and wireless access node 120 could communicate over a similar wireless communication link. Wireless access node 110 and communication network 130 communicate over communication link 121, while wireless access node 120 and communication network 140 communicate over communication link 141. Communication network 130 and network control system 150 are in communication over communication link 131.

Figure 2:
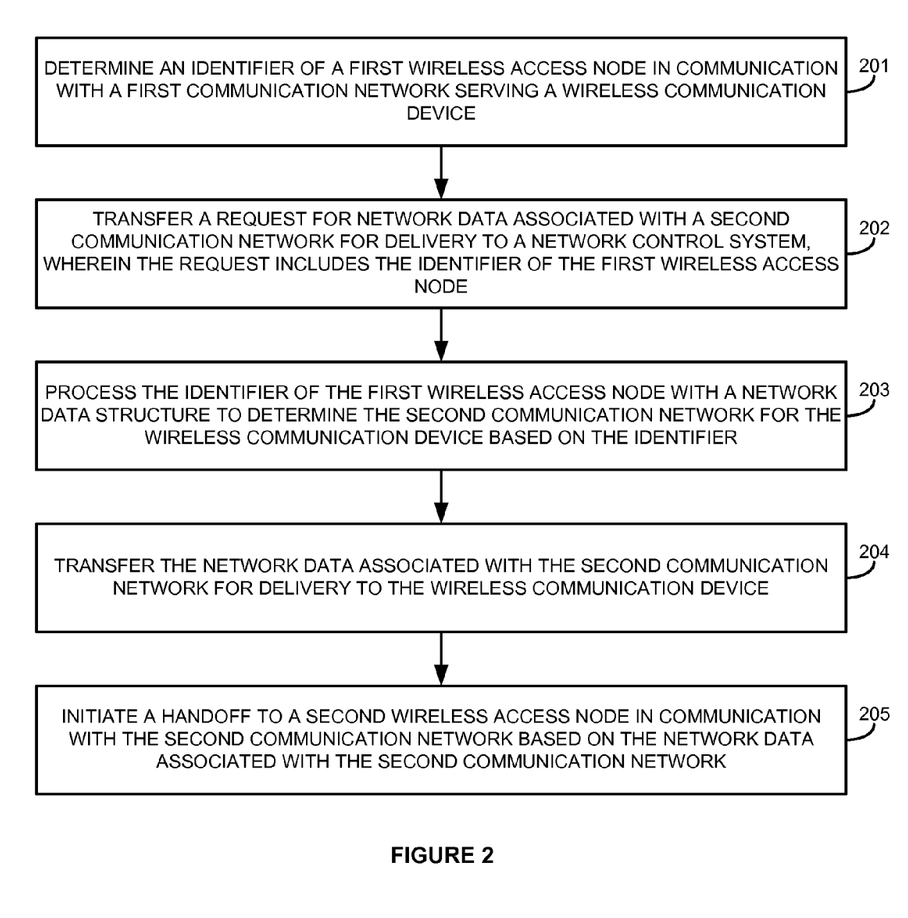
FIG. 2 is a flow diagram that illustrates an operation of the communication system.

FIG. 2 is a flow diagram that illustrates an operation of communication system 100. The steps of the operation are indicated below parenthetically. In particular, the operation of FIG. 2 shows a method to determine alternative networks for wireless communication device 101 within communication system 100.

In FIG. 2, wireless communication device 101 determines an identifier of a first wireless access node 110 in communication with a first communication network 130 serving wireless communication device 101 (201). Wireless communication device 101 typically determines the identifier of the first wireless access node 110 while scanning for the wireless access node 110 prior to establishing a communication session, based on messaging exchanged with wireless access node 110 during initiation of the communication session, or from some other information received from wireless access node 110 during the communication session.

Wireless communication device 101 transfers a request for network data associated with a second communication network 140 for delivery to network control system 150, wherein the request includes the identifier of the first wireless access node 110 (202). Wireless communication device 101 typically transfers the request for the network data to discover information associated with communication networks and/or wireless access nodes that are within proximity of wireless communication device 101, such as communication network 140 and wireless access node 120. Note that wireless communication device 101 may not have knowledge of the existence or location of wireless access node 120, and could transfer the request for the network data to obtain such information from network control system 150 as opposed to searching or scanning for wireless access node 120.

Network control system 150 processes the identifier of the first wireless access node 110 with a network data structure to determine the second communication network 140 for wireless communication device 101 based on the identifier (203). In some examples, upon receiving the request for the network data, network control system 150 could query a database of network data with the identifier of the first wireless access node 110 and determine that the second communication network 140 is likely accessible to wireless communication device 101 based on a correlation between the first wireless access node 110 and the second communication network 140 in the database. For example, the network database could correlate the first wireless access node 110 to the second wireless access node 120 based on a close geographical proximity of the two access nodes 110 and 120, which suggests that since wireless communication device 101 is presently in communication with the first wireless access node 110, the second wireless access node 120 is likely accessible by device 101 as well.

In some examples, the request for the network data could additionally include a velocity indicator of wireless communication device 101 that indicates a direction and velocity that wireless communication device 101 is moving. In this case, network control system 150 could determine if wireless communication device 101 is moving towards the second wireless access node 120 based on the velocity indicator and preexisting knowledge of the respective locations of nodes 110 and 120. If network control system 150 determines that wireless communication device 101 is moving towards wireless access node 120, network control system 150 would be more likely to determine the second communication network 140 for wireless communication device 101 than if device 101 were moving away from node 120.

After determining the second communication network 140 for wireless communication device 101, network control system 150 transfers the network data associated with the second communication network 140 for delivery to wireless communication device 101 (204). The network data associated with the second communication network 140 could comprise any information that identifies the second communication network 140 and assists wireless communication device 101 in locating and connecting to the network 140. For example, the network data associated with the second communication network 140 could comprise an identifier of the second wireless access node 120, a frequency of a radio frequency (RF) signal associated with the second wireless access node 120, a service set identifier (SSID), a base station identifier (BSID), a service name or type, access codes, security codes, a sector associated with wireless access node 120, or any other information associated with wireless access node 120 and/or communication network 140.

Responsive to receiving the network data from network control system 150, wireless communication device 101 initiates a handoff to the second wireless access node 120 in communication with the second communication network 140 based on the network data associated with the second communication network 140 (205). In some examples, wireless communication device 101 could activate an antenna to scan for wireless access node 120 based on the network data received from network control system 150. For example, if the network data comprises a frequency of an RF signal associated with the second wireless access node 120, wireless communication device 101 could initiate the handoff to the second wireless access node 120 by scanning for the frequency of the RF signal associated with the second wireless access node 120, and handoff to node 120 after successfully locating and communicating with node 120.

Advantageously, wireless communication device 101 can request network data associated with alternative communication networks that device 101 could potentially connect to by including the identifier of the first wireless access node 110 in the request. In this manner, network control system 150 provides assistance to wireless communication device 101 to locate and connect to another communication network 140 that might be in the proximity or otherwise accessible to wireless communication device 101 based on knowledge of the identifier of the first wireless access node 110 that is initially serving device 101.

Figure 3:
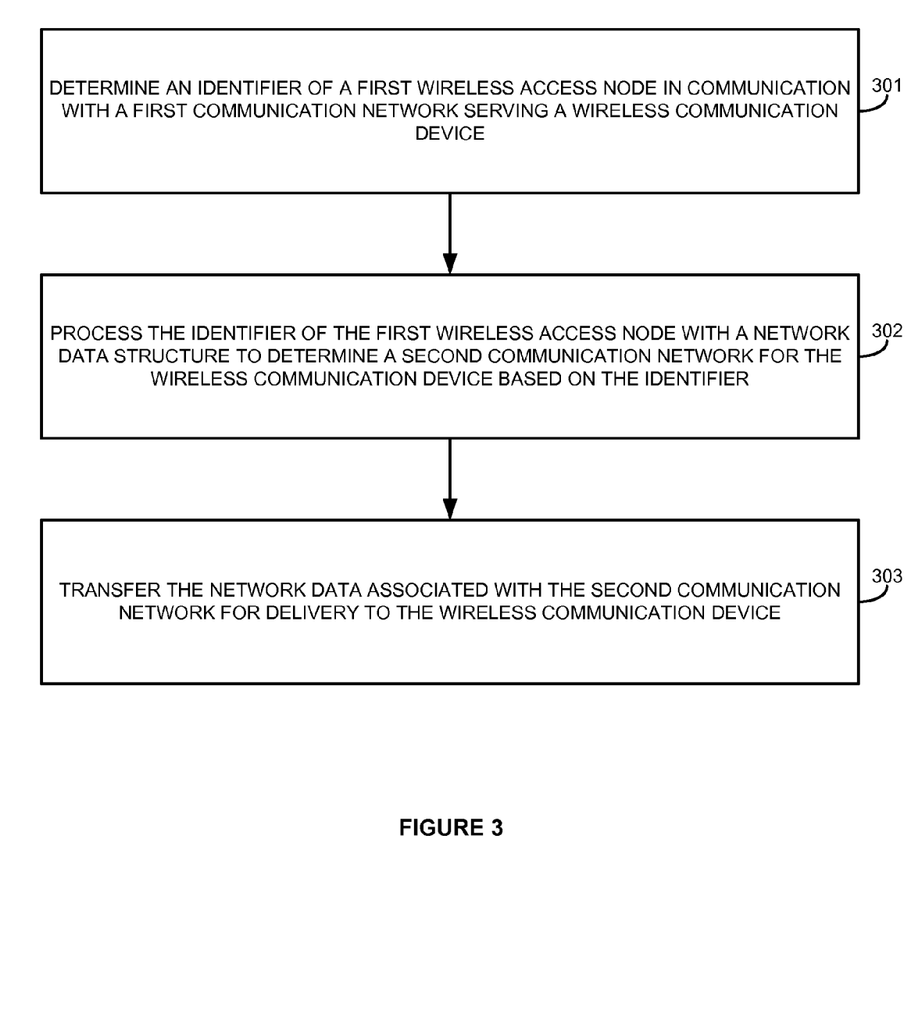
FIG. 3 is a flow diagram that illustrates an operation of the communication system.

FIG. 3 is a flow diagram that illustrates an operation of communication system 100. The steps of the operation are indicated below parenthetically. In particular, the operation of FIG. 2 shows a method of operating network control system 150 to determine alternative networks for wireless communication device 101 within communication system 100.

In FIG. 3, network control system 150 determines an identifier of a first wireless access node 110 in communication with a first communication network 130 serving wireless communication device 101 (301). Wireless communication device 101 typically determines the identifier of the first wireless access node 110 based on registration information, authentication data, or other messaging exchanged with wireless communication device 101 during initiation of a communication session with wireless access node 110. In some examples, network control system 150 may access a network database to determine the identifier of the wireless access node 110 that is presently serving wireless communication device 101, such as a home location register (HLR), visitor location register (VLR), or some other network database. Additionally or alternatively, network control system 150 could also determine identifiers of other network elements serving wireless communication device 101, such as a mobile switching center (MSC), authentication, authorization, and accounting (AAA) server, network gateway, service node, or any other system associated with communication network 130.

Network control system 150 processes the identifier of the first wireless access node 110 with a network data structure to determine the second communication network 140 for wireless communication device 101 based on the identifier (302). Network control system 150 typically processes the identifier to discover information associated with communication networks and/or wireless access nodes that are within proximity of wireless communication device 101 or would otherwise be accessible to device 101, such as communication network 140 and wireless access node 120. For example, network control system 150 could query a database of network data with the identifier of the first wireless access node 110 and determine that the second communication network 140 is likely accessible to wireless communication device 101 based on a correlation between the first wireless access node 110 and the second wireless access node 120 in the database.

Network control system 150 then transfers the network data associated with the second communication network 140 for delivery to wireless communication device 101 (303). The network data associated with the second communication network 140 could comprise any information that identifies the second communication network 140 and assists wireless communication device 101 in locating and connecting to the network 140. Responsive to receiving the network data from network control system 150, wireless communication device 101 would typically initiate a handoff to the second wireless access node 120 in communication with the second communication network 140 based on the network data received from network control system 150. In this manner, network control system 150 automatically provides assistance to wireless communication device 101 to locate and connect to other communication networks 140 that might be in the proximity or otherwise accessible to wireless communication device 101, based on the identifier of the first wireless access node 110 that is initially serving device 101.

Referring back to FIG. 1, wireless communication device 101 could comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), World-wide Interoperability for Microwave Access (WiMAX), IEEE 802.11 protocols (Wi-Fi), Bluetooth, Internet, telephony, or any other wireless network protocol that facilitates communication between wireless communication device 101 and wireless access nodes 110 and 120.

Wireless access nodes 110 and 120 each comprise RF communication circuitry and an antenna. The RF communication circuitry typically includes an amplifier, filter, RF modulator, and signal processing circuitry. Wireless access nodes 110 and 120 may also comprise a router, server, memory device, software, processing circuitry, cabling, power supply, network communication interface, structural support, or some other communication apparatus. Wireless access nodes 110 and 120 could each comprise a base station, Internet access node, telephony service node, wireless data access point, or some other wireless communication system—including combinations thereof. Some examples of wireless access nodes 110 and 120 include a base transceiver station (BTS), base station controller (BSC), radio base station (RBS), Node B, enhanced Node B (eNode B), and others. Wireless network protocols that may be utilized by wireless access nodes 110 and 120 include CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof.

Communication networks 130 and 140 comprise core networks of a wireless communication provider, and could include routers, gateways, telecommunication switches, servers, processing systems, or other communication equipment and systems for providing communication and data services. Communication networks 130 and 140 could comprise wireless communication nodes, telephony switches, Internet routers, network gateways, computer systems, communication links, or some other type of communication equipment—including combinations thereof. Communication networks 130 and 140 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication networks 130 and 140 may be configured to communicate over metallic, wireless, or optical links—including combinations thereof. Communication networks 130 and 140 may be configured to use time-division multiplexing (TDM), Internet Protocol (IP), Ethernet, optical networking, wireless protocols, communication signaling, or some other communication format—including combinations thereof. In some examples, communication networks 130 and 140 includes further access nodes and associated equipment for providing communication services to many wireless communication devices across a large geographic region.

Network control system 150 comprises a processing system and communication transceiver. Network control system 150 may also include other components such as a router, server, data storage system, and power supply. Network control system 150 may reside in a single device or may be distributed across multiple devices. Network control system 150 may be a discrete system or may be integrated within other systems—including other systems within communication system 100. In some examples, network control system 150 could comprise a network switch, mobile switching center, database, router, switching system, packet gateway, network gateway system, Internet access node, application server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, and 141 use metal, air, space, optical fiber such as glass or plastic, or some other material as the transport medium—including combinations thereof. Communication links 121, 131, and 141 could use various communication protocols, such as TDM, IP, Ethernet, telephony, optical networking, hybrid fiber coax (HFC), communication signaling, wireless protocols, or some other communication format—including combinations thereof. Communication links 121, 131, and 141 may be direct links or could include intermediate networks, systems, or devices.

Figure 4:
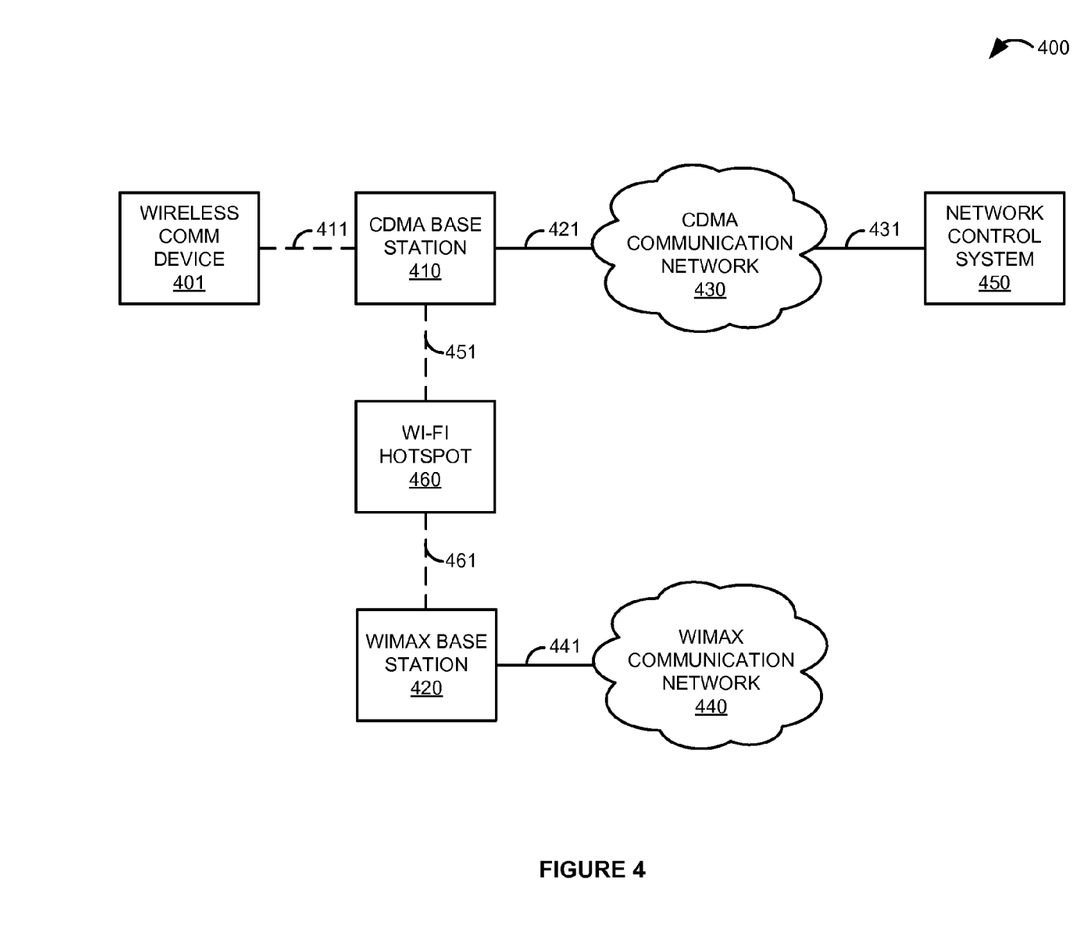
FIG. 4 is a block diagram that illustrates a communication system in an exemplary embodiment.

FIG. 4 is a block diagram that illustrates communication system 400. Communication system 400 includes wireless communication device 401, CDMA base station 410, WiMAX base station 420, CDMA communication network 430, WiMAX communication network 440, network control system 450, and Wi-Fi hotspot 460. As shown in FIG. 4, wireless communication device 401 and CDMA base station 410 are presently in communication over wireless communication link 411, but device 401 and WiMAX base station 420 and/or Wi-Fi hotspot 460 could communicate over similar wireless links (not shown). CDMA base station 410 and CDMA communication network 430 communicate over communication link 421, and WiMAX base station 420 and WiMAX communication network 440 are in communication over communication link 441. Wi-Fi hotspot 460 and CDMA base station 410 communicate over wireless communication link 451, while Wi-Fi hotspot 460 and WiMAX base station 420 communicate over wireless communication link 461. CDMA communication network 430 and network control system 450 are in communication over communication link 431. In FIG. 4, wireless communication device 401 comprises a 3G/4G dual-mode device capable of communicating with CDMA base station 410, WiMAX base station 420, and Wi-Fi hotspot 460.

Figure 5:
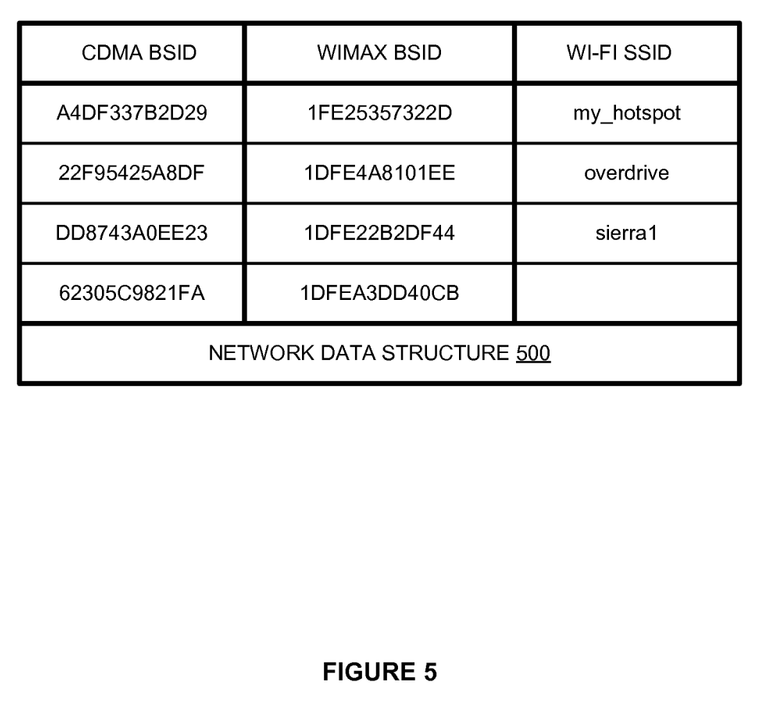
FIG. 5 is a block diagram that illustrates a network data structure in an exemplary embodiment.

FIG. 5 is a block diagram that illustrates network data structure 500 in an exemplary embodiment. In this example, network data structure 500 comprises a table in a network database, although other data formats and structures could be used. The table shown in network data structure 500 includes columns labeled CDMA BSID, WIMAX BSID, and WI-FI SSID. Each row in the table represents related data, such that the values in the CDMA BSID field are associated with the values in the WIMAX BSID and WI-FI SSID fields in each corresponding row. Typically, the values in network data structure 500 are populated by network control system 450 or some other network element or system associated with CDMA communication network 430 and/or WiMAX communication network 440. In some examples, the information contained in network data structure 500 could be predetermined, or could be dynamically updated based on changes in network topography and availability of various network nodes at any given time.

The values shown in the CDMA BSID column represent BSIDs of base stations associated with CDMA communication network 430, such as CDMA base station 410. Likewise, the values shown in the WIMAX BSID column represent BSIDs of base stations associated with WiMAX communication network 440, such as WiMAX base station 420. The WI-FI SSID column provides SSIDs for Wi-Fi hotspots connected to CDMA communication network 430 and/or WiMAX communication network 440. Note that additional information associated with CDMA communication network 430 and WiMAX communication network 440 could be included in network data structure 500, including multiple correlations between several CDMA BSIDs, WiMAX BSIDs, and Wi-Fi SSIDs, but are not shown in data structure 500 for clarity. The information in network data structure 500 is utilized by network control system 450 to assist in determining network data associated with alternative communication networks available to wireless communication device 401.

Figure 6:
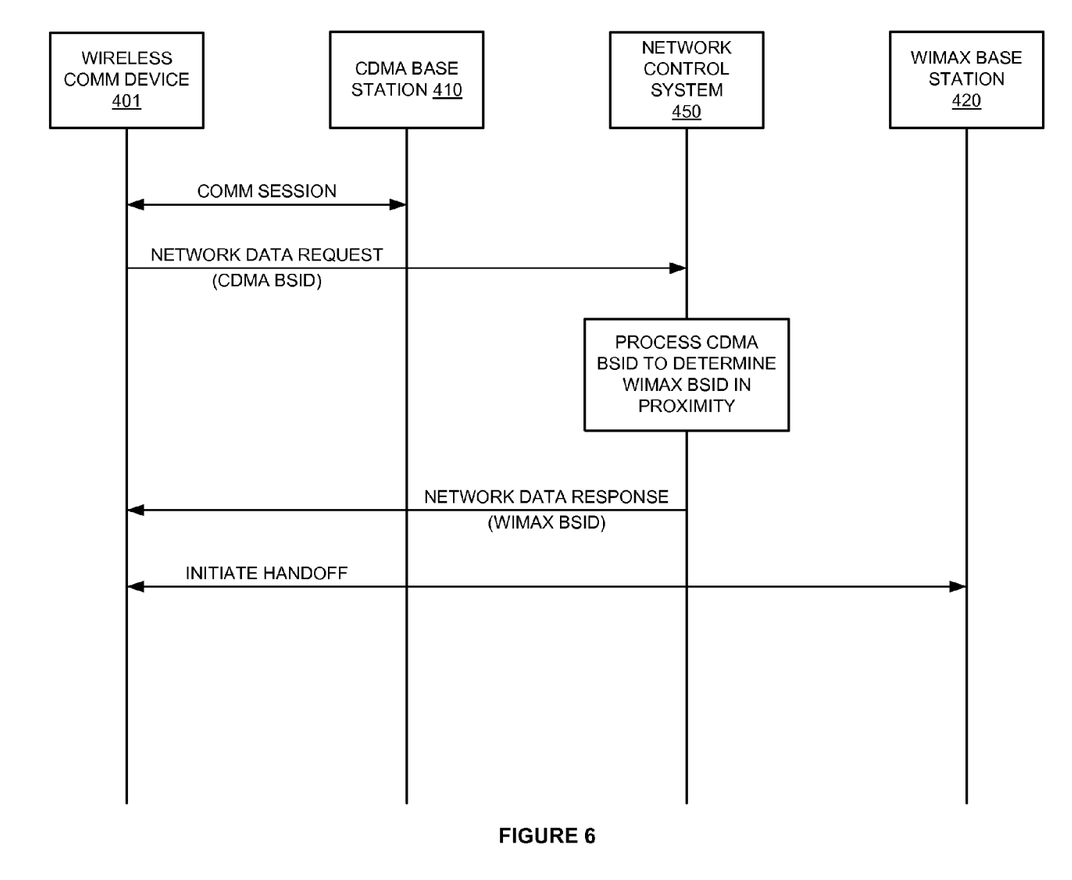
FIG. 6 is a sequence diagram that illustrates an operation of the communication system in an exemplary embodiment.

FIG. 6 is a sequence diagram that illustrates an operation of communication system 400 in an exemplary embodiment. The operation of FIG. 6 begins when a communication session is established between wireless communication device 401 and CDMA base station 410. Responsive to connecting to CDMA base station 410 or entering a new sector of base station 410, wireless communication device 401 transfers a network data request for delivery to network control system 450. The network data request includes the BSID of the CDMA base station 410, which is A4DF337B2D29 in this example, corresponding to the first entry in network data structure 500.

Network control system 450 receives the network data request from wireless communication device 401 and processes the CDMA BSID to determine a WiMAX BSID in proximity of the CDMA base station 410. In order to determine the WiMAX BSID, network control system 450 queries network data structure 500 with the CDMA BSID value of A4DF337B2D29 provided in the request, and retrieves the corresponding WiMAX BSID of 1FE25357322D. In this example, WiMAX BSID 1FE25357322D identifies WiMAX base station 420. Since network data structure 500 relates these respective BSIDs of CDMA network 430 and WiMAX network 440, network control system 450 determines that WiMAX base station 420 is in the vicinity of CDMA base station 410, and thus also in the vicinity of wireless communication device 401.

Network control system 450 transfers the network data associated with WiMAX base station 420 for delivery to wireless communication device 401, which is a WiMAX BSID value of 1FE25357322D in this example. Upon receipt of this network data, wireless communication device 401 powers up a 4G radio antenna and initiates a handoff to WiMAX base station 420 based on the received WiMAX BSID. Advantageously, since network control system 450 assists wireless communication device 401 in locating WiMAX base station 420 so that device 401 can connect to the preferred 4G WiMAX network 440, wireless communication device 401 preserves battery power by not powering up the 4G antenna to scan for WiMAX base station 420.

Figure 7:
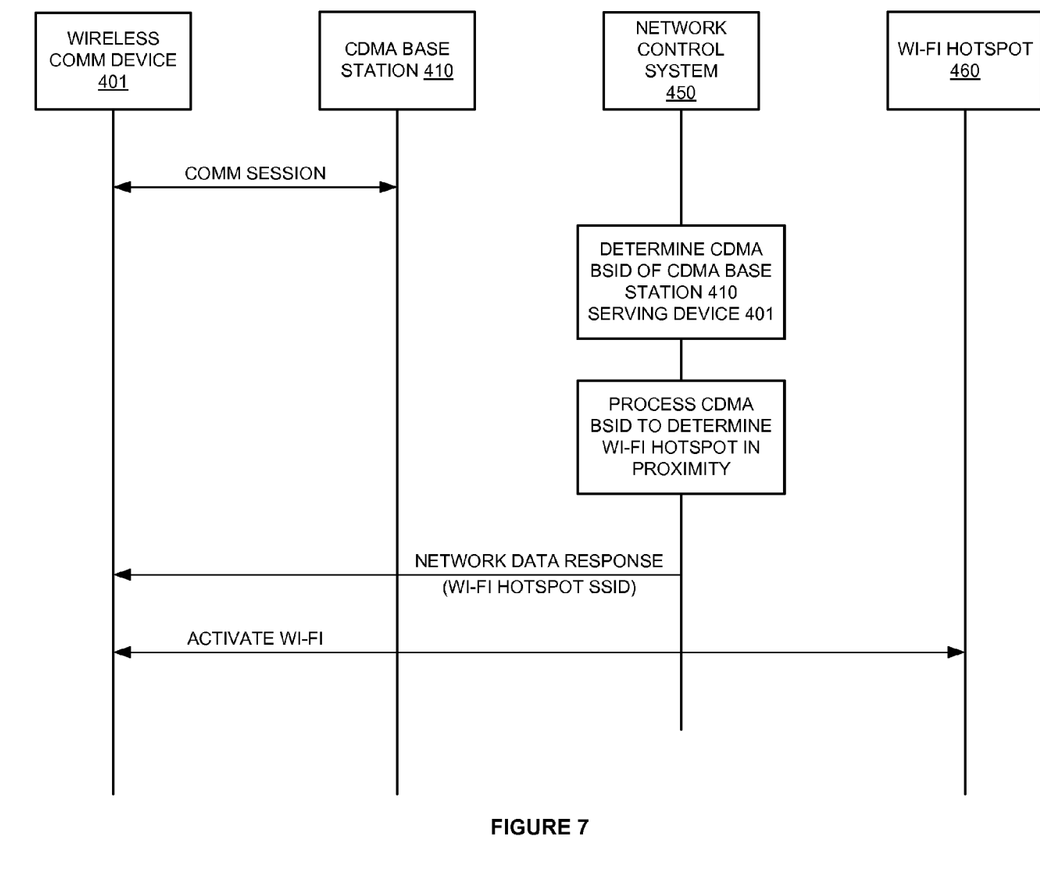
FIG. 7 is a sequence diagram that illustrates an operation of the communication system in an exemplary embodiment.

FIG. 7 is a sequence diagram that illustrates an operation of communication system 400 in an exemplary embodiment. The operation of FIG. 7 begins when a communication session is established between wireless communication device 401 and CDMA base station 410. When wireless communication device 401 registers with CDMA network 430 via CDMA base station 410, network control system 450 determines the BSID of CDMA base station 410 serving wireless communication device 401. As discussed above with regard to FIG. 6, the BSID of CDMA base station 410 is A4DF337B2D29, corresponding to the first entry in network data structure 500.

Upon determining the BSID of CDMA base station 410, network control system 450 processes the BSID to determine a Wi-Fi hotspot 460 in proximity to base station 410. In order to determine the Wi-Fi hotspot 460, network control system 450 processes network data structure 500 with the CDMA BSID of A4DF337B2D29, and retrieves the corresponding Wi-Fi SSID of "my_hotspot". In this example, Wi-Fi SSID "my_hotspot" identifies Wi-Fi hotspot 460. Since network data structure 500 relates the BSID of CDMA base station 410 and Wi-Fi hotspot 460, network control system 450 determines that Wi-Fi hotspot 460 is proximate to CDMA base station 410 and therefore proximate to wireless communication device 401 as well.

Network control system 450 transfers the network data associated with Wi-Fi hotspot 460 for delivery to wireless communication device 401, which is the Wi-Fi SSID of "my_hotspot" in this example. Upon receipt of this network data, wireless communication device 401 powers up a Wi-Fi radio antenna and searches for Wi-Fi hotspot 460 using the "my_hotspot" SSID. However, in some examples, despite receiving network data for alternative networks within range of device 401, wireless communication device 401 could delay the handoff to Wi-Fi hotspot 460 or determine not to handoff based on remaining battery power for device 401. For example, if after receiving the network data from network control system 450, wireless communication device 401 determines that the battery power supply is low and that handing off to either Wi-Fi hotspot 460 or WiMAX base station 420 would consume excessive battery power to the detriment of the user experience, device 401 could decide not to handoff in order to preserve battery life. The handoff decision based on remaining battery power could be determined by wireless communication device 401 using threshold values.

Advantageously, since network control system 450 assists wireless communication device 401 in locating Wi-Fi hotspot 460, device 401 can leave its Wi-Fi capability deactivated until alerted of the proximity of Wi-Fi hotspot 460 from network control system 450, thereby extending battery life by not activating the Wi-Fi antenna to scan for Wi-Fi hotspot 460 until hotspot 460 is within range of device 401. Furthermore, although wireless communication device 401 comprises a 3G/4G dual-mode device in this example, in cases where wireless communication device 401 is only a 3G device with Wi-Fi capabilities, network control system 450 can assist device 401 to indirectly connect to the preferred 4G WiMAX network 440 when Wi-Fi hotspot 460 comprises a 3G/4G Wi-Fi hotspot and is in communication with WiMAX network 440 via WiMAX base station 420.

Figure 8:
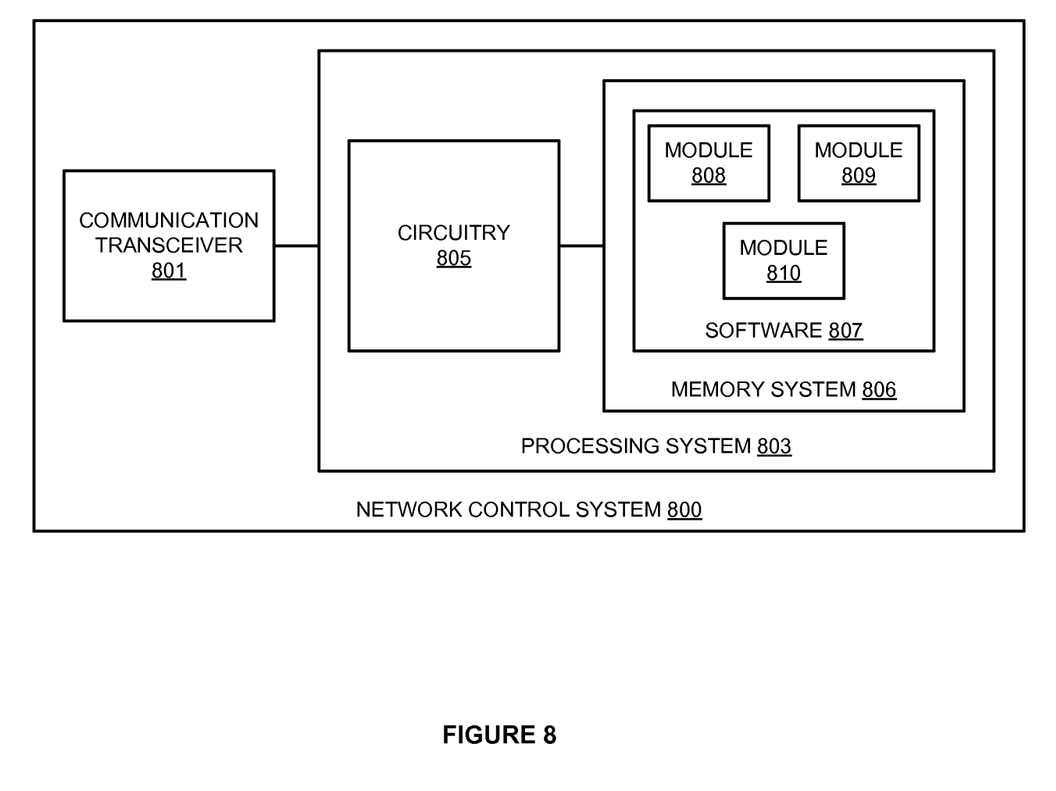
FIG. 8 is a block diagram that illustrates a network control system.

FIG. 8 is a block diagram that illustrates network control system 800. Network control system 800 provides an example of network control system 150, although system 150 may use alternative configurations. Network control system 800 comprises communication transceiver 801 and processing system 803. Processing system 803 is linked to communication transceiver 801. Processing system 803 includes processing circuitry 805 and memory system 806 that stores operating software 807. Operating software 807 comprises software modules 808-810.

Communication transceiver 801 comprises components that communicate over communication links, such as network cards, ports, RF transceivers, processing circuitry and software, or some other communication components. Communication transceiver 801 may be configured to communicate over metallic, wireless, or optical links. Communication transceiver 801 may be configured to use TDM, IP, Ethernet, optical networking, wireless protocols, communication signaling, or some other communication format—including combinations thereof. Communication transceiver 801 could be configured to transfer network data associated with a second communication network for delivery to a wireless communication device.

Processing circuitry 805 comprises microprocessor and other circuitry that retrieves and executes operating software 807 from memory system 806. Processing circuitry 805 may comprise a single device or could be distributed across multiple devices—including devices in different geographic areas. Processing circuitry 805 may be embedded in various types of equipment. Memory system 806 comprises a non-transitory computer readable storage medium, such as a disk drive, flash drive, data storage circuitry, or some other hardware memory apparatus. Memory system 806 may comprise a single device or could be distributed across multiple devices—including devices in different geographic areas. Memory system 806 may be embedded in various types of equipment. Operating software 807 comprises computer programs, firmware, or some other form of machine-readable processing instructions. Operating software 807 may include an operating system, utilities, drivers, network interfaces, applications, or some other type of software. In this example, operating software 807 comprises software modules 808-810, although software 807 could have alternative configurations in other examples.

When executed by circuitry 805, operating software 807 directs processing system 803 to operate as described herein for network control system 150. In particular, operating software 807 may direct processing system 803 to determine an identifier of a first wireless access node in communication with a first communication network serving a wireless communication device, and process the identifier of the first wireless access node with a network data structure to determine a second communication network for the wireless communication device based on the identifier. Further, operating software 807 may direct processing system 803 to direct communication transceiver 801 to transfer the network data associated with the second communication network for delivery to the wireless communication device.

In this example, operating software 807 comprises an identifier determination software module 808 that determines an identifier of a first wireless access node in communication with a first communication network serving a wireless communication device. Additionally, operating software 807 comprises a network determination software module 809 that processes the identifier of the first wireless access node with a network data structure to determine a second communication network for the wireless communication device based on the identifier. Operating software 807 also comprises a data transfer software module 810 that transfers the network data associated with the second communication network for delivery to the wireless communication device.

Figure 9:
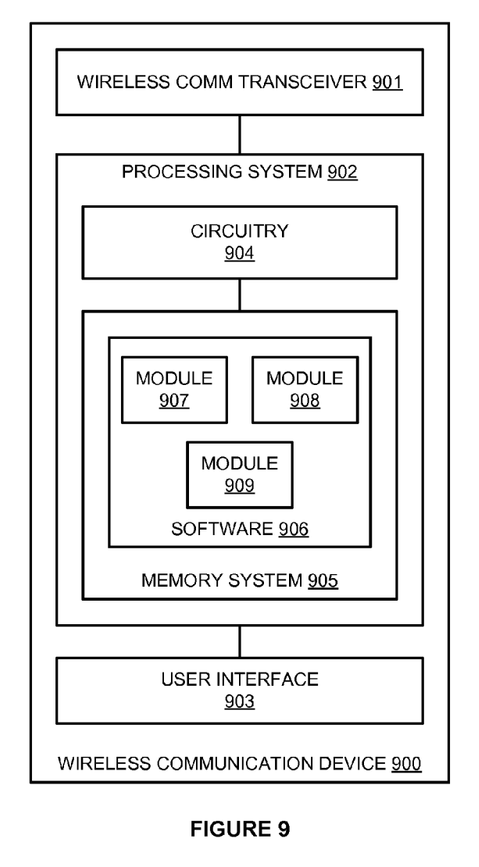
FIG. 9 is a block diagram that illustrates a wireless communication device.

FIG. 9 is a block diagram that illustrates wireless communication device 900. Wireless communication device 900 provides an example of wireless communication device 101, although device 101 could use alternative configurations. Wireless communication device 900 comprises wireless communication transceiver 901, processing system 902, and user interface 903. Processing system 902 is linked to wireless communication transceiver 901 and user interface 903. Processing system 902 includes processing circuitry 904 and memory system 905 that stores operating software 906. Operating software 906 comprises software modules 907-909.

Wireless communication device 900 may include other well-known components such as a battery and enclosure that are not shown for clarity. Wireless communication device 900 may comprise a telephone, computer, e-book, mobile Internet appliance, media player, game console, wireless network interface card, or some other wireless communication apparatus—including combinations thereof.

Wireless communication transceiver 901 comprises RF communication circuitry and an antenna. The RF communication circuitry typically includes an amplifier, filter, RF modulator, and signal processing circuitry. Wireless communication transceiver 901 may also include a memory system, software, processing circuitry, or some other communication device. Wireless communication transceiver 901 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. Wireless communication transceiver 901 is configured to transfer a request for network data associated with a second communication network for delivery to a network control system, wherein the request includes an identifier of a first wireless access node. Further, wireless communication transceiver 901 is configured to initiate a handoff to a second wireless access node in communication with the second communication network based on network data associated with the second communication network.

User interface 903 comprises components that interact with a user to receive user inputs and to present media and/or information. User interface 903 may include a speaker, microphone, buttons, lights, display screen, touch screen, touch pad, scroll wheel, communication port, or some other user input/output apparatus—including combinations thereof. User interface 903 may be omitted in some examples.

Processing circuitry 904 comprises microprocessor and other circuitry that retrieves and executes operating software 906 from memory system 905. Processing circuitry 904 may comprise a single device or could be distributed across multiple devices—including devices in different geographic areas. Processing circuitry 904 may be embedded in various types of equipment. Memory system 905 comprises a non-transitory computer readable storage medium, such as a disk drive, flash drive, data storage circuitry, or some other hardware memory apparatus. Memory system 905 may comprise a single device or could be distributed across multiple devices—including devices in different geographic areas. Memory system 905 may be embedded in various types of equipment. Processing circuitry 904 is typically mounted on a circuit board that may also hold memory system 905 and portions of communication transceiver 901 and user interface 903. Operating software 906 comprises computer programs, firmware, or some other form of machine-readable processing instructions. Operating software 906 may include an operating system, utilities, drivers, network interfaces, applications, or some other type of software. In this example, operating software 906 comprises software modules 907-909, although software 906 could have alternative configurations in other examples.

When executed by processing circuitry 904, operating software 906 directs processing system 902 to operate wireless communication device 900 as described herein for wireless communication device 101. In particular, operating software 906 directs processing system 902 to determine an identifier of a first wireless access node in communication with a first communication network serving wireless communication device 900. Further, operating software 906 directs processing system 902 to direct wireless communication transceiver 901 to transfer a request for network data associated with a second communication network for delivery to a network control system, wherein the request includes the identifier of the first wireless access node. In addition, operating software 906 directs processing system 902 to direct wireless communication transceiver 901 to initiate a handoff to a second wireless access node in communication with the second communication network based on network data associated with the second communication network.

In this example, operating software 906 comprises an identifier determination software module 907 that determines an identifier of a first wireless access node in communication with a first communication network serving wireless communication device 900. Additionally, operating software 906 comprises a request transfer software module 908 that transfers a request for network data associated with a second communication network for delivery to a network control system, wherein the request includes the identifier of the first wireless access node. Operating software 906 also comprises a handoff initiation software module 909 that initiates a handoff to a second wireless access node in communication with the second communication network based on network data associated with the second communication network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to determine alternative networks for a wireless communication device, the method comprising:
    in the wireless communication device:
        determining an identifier of a first wireless access node in communication with a first communication network serving the wireless communication device;
        transferring a request for network data associated with a second communication network for delivery to a network control system, wherein the request includes the identifier of the first wireless access node;
    in the network control system:
        processing the identifier of the first wireless access node with a network data structure to determine the second communication network for the wireless communication device based on the identifier;
        transferring the network data associated with the second communication network for delivery to the wireless communication device; and
    in the wireless communication device, initiating a handoff to a second wireless access node in communication with the second communication network based on the network data associated with the second communication network;
    wherein the network data comprises an identifier of the second wireless access node;
    wherein the network data comprises a frequency of a radio frequency (RF) signal associated with the second wireless access node;
    wherein initiating the handoff to the second wireless access node comprises scanning for the frequency of the RF signal associated with the second wireless access node.

2. The method of claim 1 wherein the request includes a velocity indicator of the wireless communication device, and further comprising in the network control system, determining if the wireless communication device is moving towards the second wireless access node based on the velocity indicator.

3. The method of claim 1 wherein the network data comprises a service set identifier (SSID) associated with the second wireless access node.

4. The method of claim 1 wherein the network data comprises a service name associated with the second wireless access node.

5. A method of operating a network control system to determine alternative networks for a wireless communication device, the method comprising:
   determining an identifier of a first wireless access node in communication with a first communication network serving the wireless communication device;
   processing the identifier of the first wireless access node with a network data structure to determine a second communication network for the wireless communication device based on the identifier;
   receiving, from the wireless communication device, a request for network data associated with the second communication network; and
   transferring the network data associated with the second communication network for delivery to the wireless communication device, wherein the wireless communication device is configured to initiate a handoff to a second wireless access node in communication with the second communication network based on the network data associated with the second communication network;
   wherein the network data comprises an identifier of the second wireless access node;
   wherein the network data comprises a frequency of a radio frequency (RF) signal associated with the second wireless access node;
   wherein the wireless communication device configured to initiate the handoff to the second wireless access node comprises the wireless communication device configured to scan for the frequency of the RF signal associated with the second wireless access node.

6. The method of claim 5 wherein the request includes a velocity indicator of the wireless communication device, and further comprising determining if the wireless communication device is moving towards the second wireless access node based on the velocity indicator.

7. The method of claim 5 wherein the network data comprises a service set identifier (SSID) associated with the second wireless access node.

8. The method of claim 5 wherein the network data comprises a service name associated with the second wireless access node.

9. A network control system to determine alternative networks for a wireless communication device, the system comprising:
   a processing system configured to determine an identifier of a first wireless access node in communication with a first communication network serving the wireless communication device, and process the identifier of the first wireless access node with a network data structure to determine a second communication network for the wireless communication device based on the identifier; and
   a communication transceiver configured to receive a request for network data associated with the second communication network from the wireless communication device and to transfer the network data associated with the second communication network for delivery to the wireless communication device, wherein the wireless communication device is configured to initiate a handoff to a second wireless access node in communication with the second communication network based on the network data associated with the second communication network;
   wherein the network data comprises an identifier of the second wireless access node;
   wherein the network data comprises a frequency of a radio frequency (RF) signal associated with the second wireless access node;
   wherein the wireless communication device configured to initiate the handoff to the second wireless access node comprises the wireless communication device configured to scan for the frequency of the RF signal associated with the second wireless access node.

10. The system of claim 9 wherein the request includes a velocity indicator of the wireless communication device, and further comprising the processing system configured to determine if the wireless communication device is moving towards the second wireless access node based on the velocity indicator.

11. The system of claim 9 wherein the network data comprises a service set identifier (SSID) associated with the second wireless access node.

* * * * *